(12) United States Patent
Mizushita et al.

(10) Patent No.: US 12,249,442 B2
(45) Date of Patent: Mar. 11, 2025

(54) WIRING MEMBER

(71) Applicant: SUMITOMO WIRING SYSTEMS, LTD., Mie (JP)

(72) Inventors: Masaki Mizushita, Mie (JP); Daisuke Ebata, Mie (JP); Yuya Fukami, Mie (JP); Kenta Arai, Mie (JP); Kohei Suzuki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 151 days.

(21) Appl. No.: 17/914,427

(22) PCT Filed: Mar. 17, 2021

(86) PCT No.: PCT/JP2021/010834
§ 371 (c)(1),
(2) Date: Sep. 26, 2022

(87) PCT Pub. No.: WO2021/200158
PCT Pub. Date: Oct. 7, 2021

(65) Prior Publication Data
US 2023/0119133 A1    Apr. 20, 2023

(30) Foreign Application Priority Data
Mar. 31, 2020 (JP) .................... 2020-062125

(51) Int. Cl.
*H01B 7/18* (2006.01)
*B60R 16/02* (2006.01)
(Continued)

(52) U.S. Cl.
CPC ......... *H01B 7/188* (2013.01); *B60R 16/0215* (2013.01); *H01B 7/0846* (2013.01); *H02G 3/0418* (2013.01)

(58) Field of Classification Search
CPC ........ H01B 7/188; H01B 7/0846; H01B 7/02; H01B 7/04; H01B 7/06; H01B 7/08;
(Continued)

(56) References Cited

U.S. PATENT DOCUMENTS

| | | | | |
|---|---|---|---|---|
| 3,128,214 A | * | 4/1964 | Lay | H01B 13/012 174/72 A |
| 3,733,428 A | * | 5/1973 | Fry | H01B 7/0846 156/290 |

(Continued)

FOREIGN PATENT DOCUMENTS

| | | |
|---|---|---|
| JP | 52-88792 | 7/1977 |
| JP | 5-314833 | 11/1993 |

(Continued)

OTHER PUBLICATIONS

Japan Official Action issued in JP Application No. 2020-062125, dated Oct. 3, 2023.

(Continued)

*Primary Examiner* — William H. Mayo, III
(74) *Attorney, Agent, or Firm* — GREENBLUM & BERNSTEIN, P.L.C.

(57) ABSTRACT

A wiring member includes a first sheet including a fusion layer, a second sheet, and at least one first wire-like transmission member provided between the first sheet and the second sheet. The first sheet and the second sheet are fixed to each other via the fusion layer in a direction intersecting with a longitudinal direction of the first wire-like transmission member.

16 Claims, 6 Drawing Sheets

(51) Int. Cl.
*H01B 7/08* (2006.01)
*H02G 3/04* (2006.01)

(58) Field of Classification Search
CPC . H01B 7/12; H01B 11/04; H05K 1/11; H05K 3/30; H02G 3/0418
USPC ...... 174/34, 36, 110 R, 113 R, 117 R, 117 F, 174/117 FF
See application file for complete search history.

(56) References Cited

U.S. PATENT DOCUMENTS

| | | | | |
|---|---|---|---|---|
| 3,819,848 | A * | 6/1974 | Fry | H02G 3/0487 174/72 A |
| 4,012,577 | A * | 3/1977 | Lang | H01B 7/0876 174/34 |
| 4,486,619 | A * | 12/1984 | Trine | H01B 11/02 174/34 |
| 5,268,531 | A * | 12/1993 | Nguyen | H01B 7/0861 D13/153 |
| 5,276,759 | A * | 1/1994 | Nguyen | G02B 6/4403 174/121 R |
| 5,502,287 | A * | 3/1996 | Nguyen | H01B 7/0846 174/117 A |
| 7,807,927 | B2 * | 10/2010 | Yeh | H01B 7/0838 174/117 FF |
| 2006/0157267 | A1 * | 7/2006 | Morijiri | H01B 11/203 174/117 F |
| 2014/0204544 | A1 * | 7/2014 | Tanaka | H05K 1/118 361/752 |
| 2019/0392963 | A1 | 12/2019 | Ishida et al. | |

FOREIGN PATENT DOCUMENTS

| | | |
|---|---|---|
| JP | 8-507641 | 8/1996 |
| JP | 2016-139551 | 8/2016 |
| JP | 2017-174685 | 9/2017 |
| JP | 2018-137208 | 8/2018 |

OTHER PUBLICATIONS

International Search Report issued in International Patent Application No. PCT/JP2021/010834, dated Jun. 8, 2021, along with an English translation thereof.

International Preliminary Report on Patentability issued in International Patent Application No. PCT/JP2021/010834, dated Apr. 13, 2022, along with an English translation thereof.

* cited by examiner

WIRING MEMBER

CROSS-REFERENCE TO RELATED APLICATIONS

The present application is a U.S. National Stage of PCT/JP2021/010834, filed Mar. 17, 2021, and claims priority of Japanese Appl. No. 2020-062125 filed Mar. 31, 2020. The disclosure of Japanese Appl. No. 2020-062125 is expressly incorporated by reference herein in its entirety. PCT/JP2021/010834 published as WO2021/200158 on Oct. 7, 2021.

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Document(s)

Patent Document Japanese Patent Application Laid-Open No. 2018-137208

SUMMARY

Problem to be Solved by the Invention

It is desired that plural types of electrical wire are simply fixed to a sheet-like functional exterior member. However, when the plural types of electrical wire are fixed to the sheet-like functional exterior member via a fusion layer, for example, there is a possibility that the electrical wire cannot be fixed depending on the type of the electrical wire or cannot be fixed at sufficient strength even when it can be fixed.

Accordingly, an object is to provide a technique capable of fixing a wire-like transmission member to a first sheet material via a fusion layer regardless of a type of the wire-like transmission member.

Means to Solve the Problem

A wiring member according to the present disclosure is a wiring member including: a first sheet including a first sheet side fusion layer; a second sheet including a second sheet side fusion layer; and at least one first wire-like transmission member fixed to the first sheet using the second sheet, wherein the first wire-like transmission member is sandwiched between the first sheet and the second sheet, and the first sheet side fusion layer and the second sheet side fusion layer are fused to each other on both lateral sides of the first wire-like transmission member.

Effects of the Invention

According to the present disclosure, a wire-like transmission member can be fixed to a sheet material via a fusion layer regardless of a type of the wire-like transmission member.

DESCRIPTION OF EMBODIMENT(S)

Description of Embodiment of Present Disclosure

Figure 1:
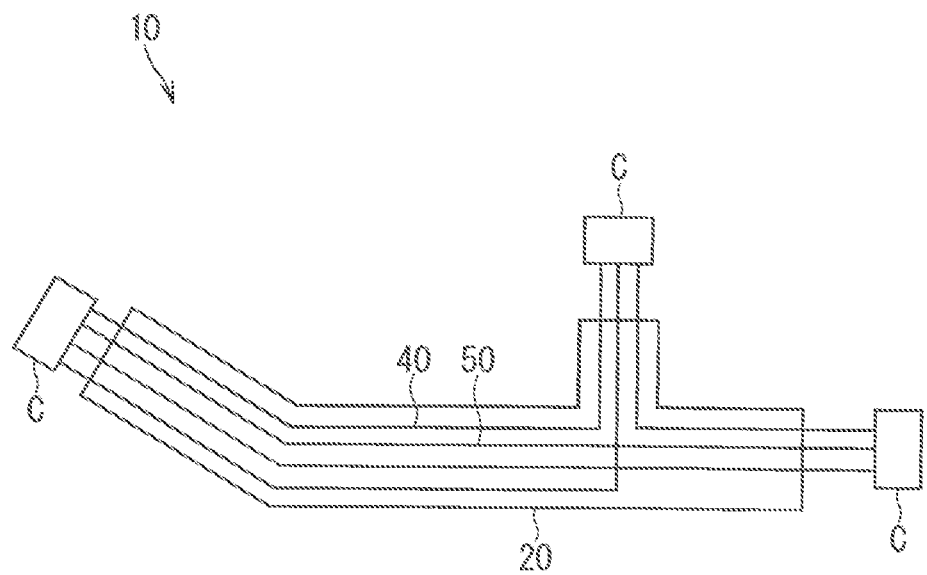
FIG. 1 is a schematic plan view illustrating a wiring member according to an embodiment 1.

Embodiments of the present disclosure are listed and described firstly.

A wiring member according to the present disclosure is as follows.

(1) A wiring member includes: a first sheet including a fusion layer; a second sheet; and at least one first wire-like transmission member provided between the first sheet and the second sheet, wherein the first sheet and the second sheet are fixed to each other via the fusion layer in a direction intersecting with a longitudinal direction of the first wire-like transmission, member. The first sheet and the second sheet are fixed to each other via the fusion layer in the direction intersecting with the longitudinal direction of the first wire-like transmission member, thus the first wire-like transmission member is kept in a state of being provided between the first sheet and the second sheet. Accordingly, the wire-like transmission member can be fixed to the sheet material via the fusion layer regardless of a type of the wire-like transmission member.

(2) in the wiring member according to (1), it is also applicable that at least one bending part of the first wire-like transmission member bended and disposed on the first sheet is provided, and the second sheet is provided in positions on both sides of the bending part in an extension direction of the first wire-like transmission member. Accordingly, the first wire-like transmission member and the first sheet hardly deviate from each other even when the first transmission member are pulled along the extension direction.

(3) In the wiring member according to (2), it is also applicable that the plurality of bending parts are provided, and the second sheet is provided in positions on both sides of each of the plurality of bending parts. Accordingly, the first wire-like transmission member and the first sheet hardly deviate from each other even when the first wire-like transmission member are pulled along the extension direction.

(4) In the wiring member according to any one of (1) to (3), it is also applicable that the first wire-like transmission member includes a first transmission wire body and a first covering layer, the fusion layer is made of polyvinyl chloride, and a material constituting the first covering layer is different from polyvinyl chloride. Accordingly, the first wire-like transmission member including the first covering layer formed of the material different from polyvinyl chloride is easily fixed to the fusion layer made of polyvinyl chloride using fusion.

(5) It is also applicable that the wiring member according to any one of (1) to (4) further includes a second wire-like transmission member including a second transmission wire body and a second covering layer, wherein the second covering layer is fused to the fusion layer, and the second wire-like transmission member is fixed to the first sheet. Accordingly, the first wire-like transmission member and the second wire-like transmission member are fixed to the same first sheet.

(6) in the wiring member according to (5), the second wire-like transmission member may be disposed on the first sheet away from the second sheet. Accordingly, an overlap between the second sheet and the second wire-like transmission member is suppressed.

(7) In the wiring member according to (5) or (6), the second covering layer may be made up of a material different from a material of a first covering layer of the first wire-like transmission member. Accordingly, the first wire-like transmission member and the second wire-like transmission member each having the covering layer made up of a different material are fixed to the first sheet via the fusion layer.

(8) In the wiring member according to any one of (1) to (7), it is also applicable that a section where a plurality of first wire-like transmission members are parallelly arranged is provided, and the fusion layer and the second sheet are fused to each other between the plurality of first wire-like transmission members. Accordingly, the plurality of first wire-like transmission members are partitioned by the second sheet, thus contact between the plurality of first wire-like transmission members is suppressed.

(9) In the wiring member according to (8), it is also applicable that one piece of the second sheet is provided across the plurality of first wire-like transmission members, and the second sheet is fused to the first sheet in three or more positions including a position between the plurality of first wire-like transmission members and positions on both sides of the position in the one piece of the second sheet. Accordingly, the plurality of first wire-like transmission members are fixed to the first sheet by one piece of the second sheet.

(10) In the wiring member according to any one of (1) to (7), it is also applicable that a collected part where a plurality of first wire-like transmission members are collected is provided, and the collected part is disposed inside one annular part formed by first wire-like transmission members can be simply fixed to the first sheet.

(11) In the wiring member according to any one of (1) to (10), the second sheet may include a second sheet side fusion layer fused to the fusion layer of the first sheet. Accordingly, the fusion layers of the first sheet and the second sheet can be fused to each other, thus the first sheet and the second sheet are rigidly fixed to each other.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
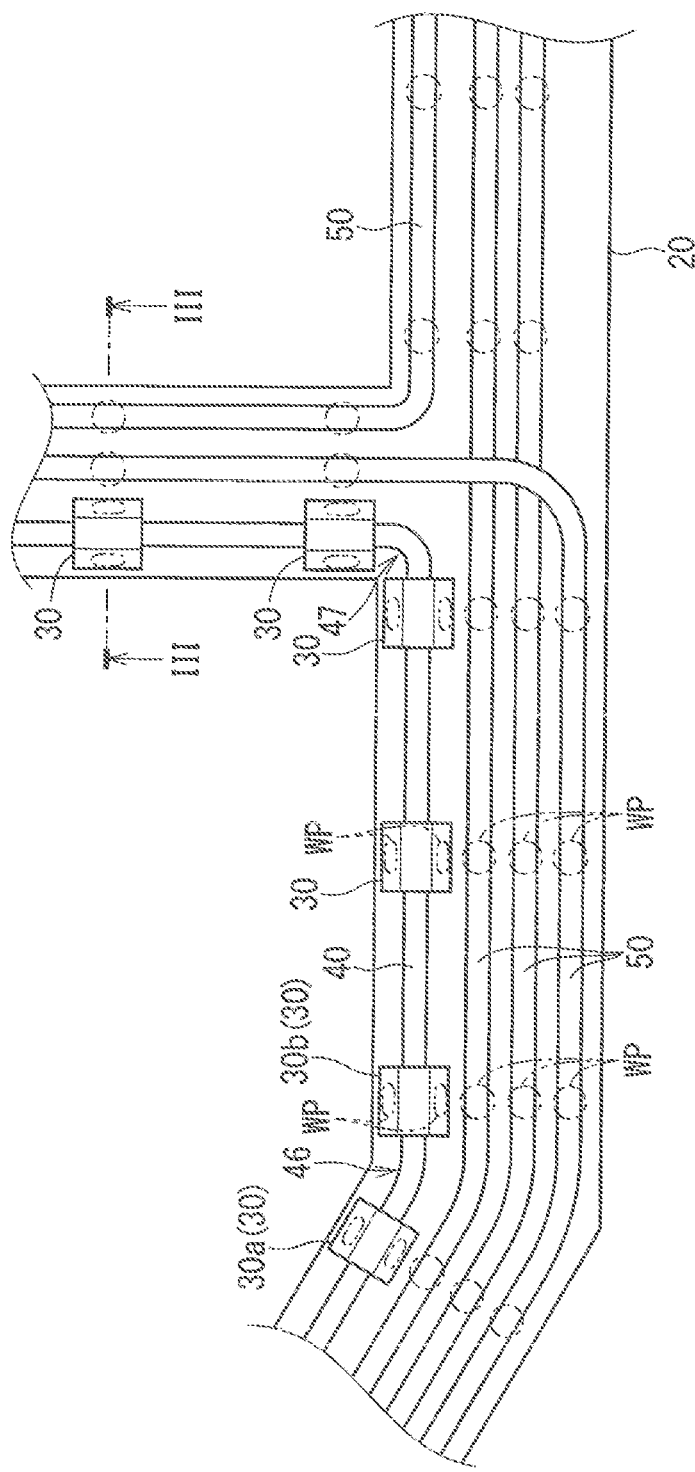
FIG. 2 is a partial enlarged view of FIG. 1.
Figure 3:
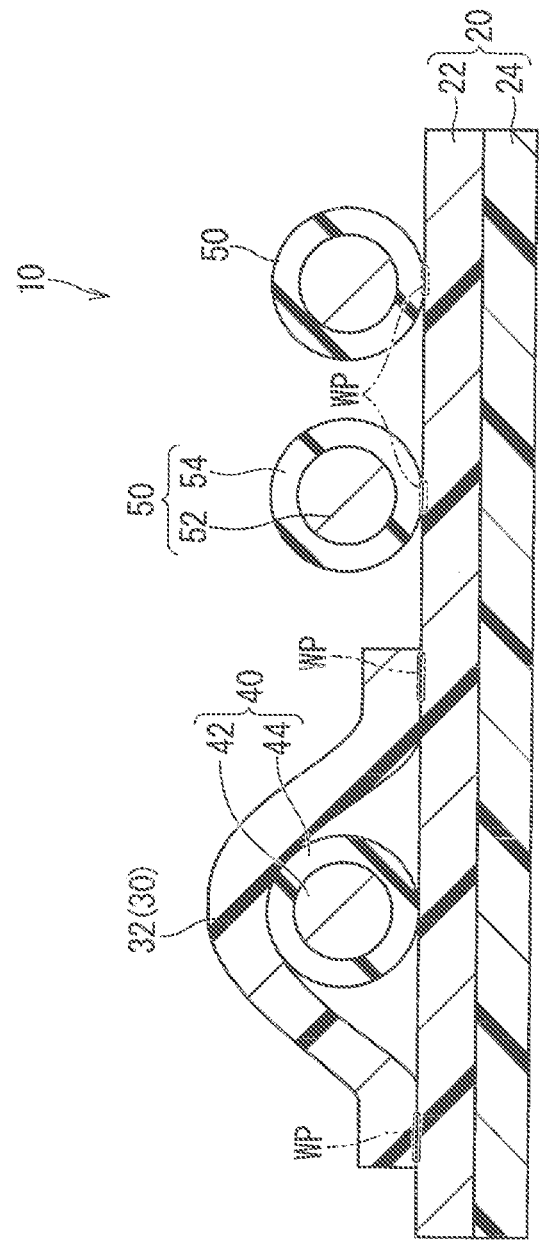
FIG. 3 is a cross-sectional view of the wiring member cut along a III-III line in FIG. 2.

A wiring member according to an embodiment 1 is described hereinafter. FIG. 1 is a schematic plan view illustrating a wiring member according to the embodiment 1. FIG. 2 is a partial enlarged view of FIG. 1. FIG. 3 is a cross-sectional view of the wiring member cut along a line in FIG. 2. A portion illustrated by a virtual line in FIG. 2 and FIG. 3 are fusion part WP.

The wiring member 10 includes a first sheet 20, a second sheet 30, and a first wire-like transmission member 40. Herein, the wiring member 10 further includes a second wire-like transmission member 50. The first wire-like transmission member 40 and the second wire-like transmission member 50 are fixed to the first sheet 20. A fixing state of being fixed to the first sheet 20 is different between the first wire-like transmission member 40 and the second wire-like transmission member 50.

The first sheet 20 includes a first sheet side fusion layer 22. The first sheet side fusion layer 22 includes a resin material, or preferably includes a thermoplastic resin material. The resin material of the first sheet side fusion layer 22 is softened and fused to a fusion target. A type of the resin material is not particularly limited, but polyvinyl chloride (PVC), polyethylene (PE), polypropylene (PP), or polyethylene terephthalate (PET) can be adopted, for example.

A structure of the first sheet side fusion layer 22 is not particularly limited. For example, the first sheet side fusion layer 22 may be a sheet having an evenly filled cross-sectional surface (also referred to as a non-foam sheet or a solid sheet, for example). The first sheet side fusion layer 42 is also considered a foam sheet, for example. The first sheet side fusion layer 22 is also considered a fibrous material sheet such as a braided cloth, a woven cloth, or a non-woven cloth, for example.

The first sheet 20 may include a single layer structure made up of the first sheet side fusion layer 22. The first sheet 20 may also have a multilayer structure. When the first sheet 20 has the multilayer structure, the first sheet side fusion layer 22 may appear in at least one main surface of the first sheet 20. Herein, the first sheet 20 includes a first layer 22 and a second layer 24. The first layer 22 is the first sheet side fusion layer 22. The wire-like transmission members 40 and 50 are fixed to the first layer 22. One surface of the first layer 22 is one main surface of the first sheet 20.

The second layer 24 is formed of a material different from that of the first sheet side fusion layer 22, or has a different structure. The second layer 24 increases a function of the first sheet side fusion layer 22 or adds a function which the first sheet side fusion layer 22 does not have to the first sheet 20. A material constituting the second layer 24 may be a material described for die first sheet side fusion layer 22 described above or metal, for example. A structure of the second layer 24 may be any of the structure described for the first sheet side fusion layer 22 described above. One surface of the second layer 24 is the other main surface of the first sheet 20.

The first layer 22 and the second layer 24 are fixed to each other while the other surface of the first layer 22 and the other surface of the second layer 24 have contact with each other. A fixing state of the first layer 22 and the second layer 24 is not particularly limited, however, fixing by fusion or adhesion is preferable. For example, when at least one of the first layer 22 and the second layer 24 is a sheet having voids in a surface such as a fibrous material sheet or a foam sheet, a resin material or an adhesive agent enters die voids and the layers can be fixed to each other. Such a configuration causes so-called anchor effect, thus the first layer 22 and the second layer 24 are rigidly fixed.

In the description herein, the first layer 22 is a solid sheet made of resin and the second layer 24 is a fibrous material sheet. In the description herein, the first layer 22 and the second layer 24 are fused to each other. That is to say, the resin of the first layer 22 enters between the fibers of the second layer 24 while having flowability, and is then hardened. Maintained accordingly is a state where the resin of the first layer 22 enters between the fibers of the second layer 24, and the first layer 22 and the second layer 24 are rigidly fixed to each other.

The first layer 22 and the second layer 24 are formed to have the same size (the same planar shape). One of the first layer 22 and the second layer 24 may also be formed to be larger than the other one thereof. The first layer 22 and the second layer 24 are wholly fixed at a region where they have contact with each other. The first layer 22 and the second layer 24 may also be fixed only at a part of a region where they have contact with each other.

The first sheet 20 may be a flexible member. For example, the first layer 22 is a resin layer having an evenly filled cross-sectional surface made up of flexible resin such as flexible PVC as a material, the second layer 24 is a non-woven cloth made up of PET as a material, and the first sheet 20 is a flexible member. For example, the first sheet 20 may have a plastic property so as to be able to follow bending of the wire-like transmission members 40 and 50. That is to say, it is also applicable that the wiring member 10 can be bended in a thickness direction (bending so that a fold line follows the main surface of the first sheet 20).

The second sheet 30 includes a second sheet side fusion layer 32. The material and the structure described for the first sheet side fusion layer 22 described above can be applied to those of the second sheet side fusion layer 32. The second sheet 30 may have a single layer structure or a stacked-layer structure made up of a plurality of stacked layers. When the second sheet 30 has the stacked-layer structure, the second sheet side fusion layer 32 preferably appears in one main surface of the second sheet 30.

The second sheet 30 may have the same structure as the first sheet 20 or a different structure. When the second sheet has the same structure as the first sheet 20, a part of a piece left when the first sheet 20 is cut out of a sheet-like member having a large size may be the second sheet. Accordingly, a yield of the sheet-like member can be increased.

When the second sheet 30 has a structure different from the first sheet 20, the structure of the second sheet 30 is not particularly limited, but can be appropriately set. For example, it is also applicable that the thickness of the second sheet 30 may be the same as that of the first sheet 20, the thickness of the second sheet 30 is larger than that of the first sheet 20, or the thickness of the first sheet 20 is larger than that of the second sheet 30.

Herein, the second sheet 30 has a structure different from the first sheet 20. Herein, the second sheet 30 has a single layer structure of only the second sheet side fusion layer 32. Accordingly one main surface of the second sheet side fusion layer constitutes one main surface of the second sheet 30, and the other main surface of the second sheet side fusion layer 32 constitutes the other main surface of the second sheet 30. A size of the second sheet 30 is not particularly limited, however, the second sheet 30 is preferably formed to be smaller than the first sheet 20. It is preferable that a dimension of the second sheet 30 in at least an extension direction and/or a width direction of the first sheet 20 is formed w be smaller than that of the first sheet 20. Herein, dimensions of, the second sheet 30 in both the extension direction and the width direction of the first sheet 20 are formed to be smaller than that of the first sheet 20.

The second sheet 30 is used for fixing the first wire-like transmission member 40 to the first sheet 20. The second wire-like transmission member 50 is fixed to the first sheet 20 without using the second sheet 30. A fixing state of the first wire-like transmission member 40 and the second wire-like transmission member 50 fixed to the first sheet 20 is described in detail hereinafter.

The first wire-like transmission member 40 and the second wire-like transmission member 50 are wire-like members transmitting an electrical power or light, for example. The first sheet 20 is formed into a flat shape as a whole. The plurality of wire-like transmission members 40 and 50 are fixed to the first sheet 20, thus the wiring member 10 is kept in a flat state.

The plurality of wire-like transmission members 40 and 50 are assumed to be members connecting components in a vehicle. A connector C, for example, is provided on end portions of the wire-like transmission members 40 and 50. This connector C is connected to a connector provided in the other side component, thus the wire-like transmission members 40 and 50 are connected to the other side component. That is to say, the present wiring member 10 is used as the wiring member 10 electrically connecting various types of component in a vehicle, for example (or connecting them so that they can perform optical communication). The connector C may be fixed to the first sheet 20.

Routes of the plurality of wire-like transmission members 40 and 50 are set in. accordance with a position of a component to which the wire-like transmission members 40 and 50 are connected, for example. The plurality of wire-like transmission members 40 and 50 are fixed to the first sheet 20, thus the plurality of wire-like transmission members 40 and 50 are kept in a form following a wiring route corresponding to a position of a component as a connection destination of each of the wire-like transmission members 40 and 50. The plurality of wire-like transmission members 40 and 50 may be fixed to the first sheet 20 in a state where a branch wire is branched from a main wire. The first sheet 20 may also be formed into a shape in which a portion to which the branch wire is fixed is branched from a portion to which the main wire is fixed. Herein, the plurality of wire-like transmission members 40 and 50 are branched on the first sheet 20.

Each of the wire-like transmission members 40 and 50 include a transmission wire body and a covering layer. The transmission wire body transmits electrical power or light, for example. The covering layer covers the transmission wire body. For example, each of the wire-like transmission members 40 and 50 may be a general wire having a core wire and a covering layer around the core wire, or may also be a shielded wire, a twisted wire, an enamel wire, a nichrome wire, or an optical fiber.

The wire-like transmission members 40 and 50 transmitting the electrical power may be various kinds of signal lines or various kinds of power lines. Some of the wire-like transmission members 40 and 50 transmitting the electrical power may be used as an antenna or coil, for example, transmitting or receiving a signal or electrical power to or from a space.

The wire-like transmission members 40 and 50 may be a single wire-like object or a composite object of a plurality of wire-like objects (a twisted wire and a cable made up of a plurality of wire-like objects covered by a sheath.

The first wire-like transmission member 40 includes a first transmission wire body 42 and a first covering layer 44. The first covering layer 44 is a layer located on an outermost side of the first wire-like transmission member 40. The second transmission member 50 includes a second transmission wire body 52 and a second covering layer 54. The second covering layer 54 is a layer located on an outermost side of the second wire-like transmission member 50.

A resin material constituting the first covering layer 44 is different from a resin material constituting the first sheet side fusion layer 22, a resin material constituting the second sheet side fusion layer 32, and a resin material constituting the second covering layer 54. A type of the resin material constituting the first sheet side fusion layer 22, a type of the resin material constituting the second sheet side fusion layer 32, and a type of the resin material constituting the second covering layer 54 are the same as each other.

For example, the resin material constituting the first sheet side fusion layer 22, the sin material constituting the second sheet side fusion layer 32, and the resin material constituting the second covering layer 54 are PVC, and the material constituting a first covering layer 44 is a resin material different from PVC, In this case, the material constituting the first covering layer 44 is not particularly limited except for PVC thus polyolefin such as PE and PP, silicone resin, or fluorine resin such as polytetrafluoroethylene, for example, is also applicable. As described above, described is the case where the resin material of the second covering layer 54 is PVC and the resin material of the first covering layer 44 is not PVC, however, the materials are not limited to those in this case. Needless to say, any material is applicable as long as fixing strength of fixing the first sheet 20 is different between the first covering layer 44 and the second covering layer 54. Needless to say, also applicable is a case where used are resin materials having different contained amounts of PVC between the second covering layer 54 and the first covering layer 44, for example.

The resin material may be halogen-free. A halogen-free state indicates that chlorine and bromine in halogen are not contained or only a trace amount of halogen is contained. For example, in a standard of International Electrotechnical Commission (IEC), a case where a content rate of each of chlorine and bromine is equal to or smaller than 900 ppm and a total content rate of chlorine and bromine is equal to or smaller than 1500 ppm is defined as the halogen-free state. A halogen-free wire-like transmission member is also referred to as a zero-halogen wire (for example, a zero-halogen electrical wire in a case of an electrical wire).

A combination of materials constituting the first sheet side fusion layer 22, the second sheet side fusion layer 32, the first covering layer 44, and the second covering layer 54 is not limited thereto described above. For example, it is also applicable that a resin material constituting the first sheet side fusion layer 22, a resin material constituting the second sheet side fusion layer 32, and a resin material constituting the second covering layer 54 are PE, and a material constituting the first covering layer 44 is a resin material different from PE.

The first wire-like transmission member 40 is fixed to the first sheet 20 using the second sheet 30. Specifically, the first wire-like transmission member 40 is provided between the first sheet 20 and the second sheet 30. An annular part surrounding the first wire-like transmission member 40 is formed by the first sheet 20 and the second sheet 30. The first wire-like transmission member 40 passes through an inner space of the annular part. The first sheet 20 and the second sheet 30 are fixed via the fusion layers 22 and 32 in a direction intersecting with a longitudinal direction of the first wire-like transmission member 40. The first sheet side fusion layer 22 and the second sheet side fusion layer 32 are fused on both lateral sides of the first wire-like transmission member 40. Accordingly, the first wire-like transmission member 40 is fixed to the first sheet 20 using the second sheet 30.

The first wire-like transmission member 40 is not directly bonded to the first sheet 20 and the second sheet 30. Thus, the first wire-like transmission member 40 can be moved in a diameter direction of the annular part (direction intersecting with the extension direction of the first wire-like transmission member) also in the inner space of the annular part. The first wire-like transmission member 40 can be moved along the extension direction with respect to the annular part. When the fusion state between the second sheet 30 and the first sheet 20 are released, the first wire-like transmission member 40 is detached from the first sheet 20.

The movement of the first wire-like transmission member 40 in the diameter direction in the inner space of the annular part can be suppressed by reducing the inner space and applying pressure from the annular part to the first wire-like transmission member 40. The inner space is reduced by pressing the first wire-like transmission member 40 hard by the second sheet 30, for example.

Provided are bending parts 46 and 47 made up of the first wire-like transmission member 40 bended and disposed on the first sheet 20. An angle of the bending part is not particularly limited, but can be appropriately set. When an angle in a straight part is 180 degrees, the angle of the bending part 46 is 150 degrees, and the angle of the bending part 47 is 90 degrees, for example. The angle of the bending part preferably has any value ranging from 90 degrees to 150 degrees.

The second sheet 30 is provided in position on both sides of the bending parts 46 and 47 in the extension direction of the first wire-like transmission member 40. Suppressed accordingly is a large movement of the first wire-like transmission member 40 along the extension direction with respect to the annular part. Herein, the positions on both sides of the bending parts 46 and 47 are positions adjacent to a portion where bending is started and a portion where bending is finished. That is to say, bending of the first wire-like transmission member 40 is started in a position adjacent to the other side of the second sheet 30 in elation to one side of the second sheet 30, and is finished in a position adjacent to one side of the second sheet 30 in relation to the other side of the second sheet 30. The positions on both sides of the bending parts 46 and 47 are a straight part adjacent to the bending parts 46 and 47, for example. Needless to say, any configuration is applicable as long as the first wire-like transmission member 40 and the first sheet 20 hardly deviate from each other. Needless to say, it is sufficient that at least a direction of the second sheet 30 provided on one side of the bending parts 46 and 47 in the longitudinal direction of the first wire-like transmission member 40 and a direction of the second sheet 30 provided on the other side of the bending parts 46 and 47 in the longitudinal direction of the first wire-like transmission member 40 are different from each other, for example. The bending part 46 as an example is described in detail hereinafter.

That is to say, the first wire-like transmission member 40 extends on one side of the bending part 46 along a first direction, and extends on the other side of the bending part 46 along a second direction. The first direction and the second direction are directions intersecting with each other. A second sheet 30a is provided in a position adjacent to one side of the bending part 46. A second sheet 30b is provided in a position adjacent to the other side of the bending part 46. When a portion of the first wire-like transmission member 40 located on one side of the bending part 46 is pulled to a side of the end portion along the first direction and the first wire-like transmission member 40 is moved, the first wire-like transmission member 40 interferes with the second sheet 30b, thus the movement is suppressed. In the similar manner, when a portion of the first wire-like transmission member 40 located on the other side of the bending part 46 is pulled to a side of the end portion atone the second direction and the first wire-like transmission member 40 is moved, the first wire-like transmission member 40 interferes with the second sheet 30a, thus the movement is suppressed.

The plurality of bending parts 46 and 47 are provided in one first wire-like transmission member 40. Two bending parts are provided herein. The second sheet 30 is provided in positions on both sides of each of the plurality of bending parts 46 and 47. A route of the first wire-like transmission member 40 is set to be bended in the same direction in the bending parts 46 and 47, but may also be set to be bended in a reverse direction.

A dimension of the second sheet 30 along the width direction of the first sheet 20 in a state where the second sheet 30 is in an straight form is set to be larger than a diameter of the first wire-like transmission member 40. Accordingly, the second sheet 30 can be fused to the first sheet 20 on both lateral sides of the first wire-like transmission member 40. An interval between two fusion parts WP of the first sheet 20 and the second sheet 30 located on both lateral sides of the first wire-like transmission member 40 is not particularly limited, but can be appropriately set. A size of the fusion part WP of the first sheet 20 and the second sheet 30 along the width direction of the first sheet 20 is not particularly limited, but can be appropriately set. When the interval between two fusion parts WP and the size of the fusion part WP decrease, a dimension along the width direction of the wiring member can be reduced.

The second sheet 30 is provided to cover a part of the first sheet 20 along the width direction of the first sheet 20. The second wire-like transmission member 50 is disposed on the first sheet 20 away from the second sheet 30. The second wire-like transmission member 50 is disposed on the other part of the first sheet 20 which is not covered by the second sheet 30.

A part of the second sheet side fusion layer 32 is directed to the first sheet 20 in the second sheet 30. A part of the second sheet side fusion layer 32 directed to the first sheet 20 is fused to the first sheet side fusion layer 22.

When the first sheet side fusion layer 22 is fused to the second sheet side fusion layer 32 and the first covering layer 44 in the same condition, fusion strength between the first sheet side fusion layer 22 and the second sheet side fusion layer 32 is larger than that between the first sheet side fusion layer 22 and the first covering layer 44. The type of the resin material constituting the first sheet side fusion layer 22 is different from that of the resin material constituting the first covering layer 44, and is the same as that of the resin material constituting the second sheet side fusion layer 32, thus the fusion strength between the first sheet side fusion layer 22 and the second sheet side fusion layer 32 is larger than that between the first sheet side fusion layer 22 and the first covering layer 44. Herein, the fusion strength in the present specification can be evaluated using results separately tested in the same type of detachment test (for example, each test of JIS K6854), for example.

The second covering layer 54 is fused to the first sheet side fusion layer 22, thus the second wire-like transmission member 50 is fixed to the first sheet 20. The type of the resin material constituting the first sheet side fusion layer 22 is different from that of the resin material constituting the first covering layer 44, and is the same as that of the resin material constituting the second covering layer 54, thus the fusion strength between the first sheet side fusion layer 22 and the second covering layer 54 is larger than that between the first sheet side fusion layer 22 and the first covering layer 44.

A means of forming the fusion state is not particularly limited. Adoptable are various types of fusion means such as ultrasonic fusion, heating pressurizing fusion, hot air fusion, and high-frequency fusion. When the fusion state is formed by these means, the wire-like transmission members 40 and 50 and the first sheet 20 are in a state of fusion fixation by those means. Specifically, when the wire-like transmission members 40 and 50 and the first sheet 20 are fused by ultrasonic fusion, the fusion part WP is an ultrasonic fusion part, for example.

In the example illustrated in FIG. 2, the second sheet 30 is provided in a part of the first wire-like transmission member 40 along an extension direction thereof. The second sheet 30 is provided in a plurality of positions at intervals in the first wire-like transmission members 40 along the extension direction. The second sheet side fusion layer 32 of each second sheet 30 is fused to the first sheet side fusion layer 22. Thus, the first wire-like transmission member 40 is fixed to the first sheet 20 at a plurality of positions at intervals along the extension direction.

In each second sheet 30, when the wiring member 10 is observed along the extension, direction as illustrated in FIG. 2, a part of the second sheet side fusion layer 32 along the extension direction of the first wire-like transmission member 40 is fused to the first sheet side fusion layer 22. That is to say, each second sheet 30 is not wholly fused to the first sheet 20 along the extension direction of the first wire-like transmission member 40. Each second sheet 30 includes a portion which is not fused to the first sheet side fusion layer 22 in a part of the first wire-like transmission member 40 along the extension direction.

However, the second sheet 30 may be sequentially provided in a whole area along the extension direction of the first wire-like transmission member 40. In this case, the second sheet 30 may be sequentially fused to a whole area in the first sheet 20 along the extension direction, or may also be fused to the first sheet 20 in a plurality of positions at intervals along the extension direction.

In the example illustrated in FIG. 2, the second wire-like transmission member 50 is fused to the first sheet 20 at a plurality of positions at intervals along the extension direction. The second wire-like transmission member 50 may be sequentially fixed to the first sheet 20 along the extension direction.

In the example illustrated in FIG. 2, the first wire-like transmission member 40 and the second wire-like transmission member 50 are fused to the first sheet 20 in the same position along the extension direction in a parallel section. However, the first wire-like transmission member 40 and the second wire-like transmission member 50 may be fused to the first sheet 20 in different positions along the extension direction in a parallel section.

In the example illustrated in FIG. 2, one first wire-like transmission member 40 is provided. The plurality of first wire-like transmission members 40 may be provided. It is sufficient that at least one first wire-like transmission member 40 is provided. A case where the plurality of first wire-like transmission members 40 are provided is described in detail in an embodiment 2.

The plurality of second wire-like transmission members 50 are included. Only one second wire-like transmission member 50 may be included. When the wiring member 10 includes the second wire-like transmission member 50, it is sufficient that at least one second wire-like transmission member 50 is included. The second wire-like transmission member 50 may be omitted.

In the example illustrated in FIG. 2, the number of the second wire-like transmission members 50 is larger than that of the first wire-like transmission members 40. The number of the second wire-like transmission members 50 may be equal to or smaller than that of the first wire-like transmission members 40. When the wire-like transmission members 40 and 50 are classified according to a resin material, that is to say when the first wire-like transmission member 40 is segmentalized according to a resin material in addition to the classification of the first wire-like transmission member 40 and the second wire-like transmission member 50, the number of the second wire-like transmission members 50 is preferably largest in all types of wire-like transmission members 40 and 50. Accordingly, the number of the first wire-like transmission members 40 fixed to the first sheet 20 via the second sheet 30 can be reduced, thus the wiring member 10 is easily manufactured.

In the example illustrated in FIG. 2, the first wire-like transmission member 40 is located on an outermost side along a parallel direction of the plurality of wire-like transmission members 40 and 50. The first wire-like transmission member 40 is located on an outer side of the plurality of second wire-like transmission members 50. The first wire-like transmission member 40 may be located in an intermediate portion along a parallel direction of the plurality of wire-like transmission members 40 and 50. The first wire-like transmission member 40 may be located between the plurality of second wire-like transmission members 50.

In the example illustrated in FIG. 2, the plurality of wire-like transmission members 40 and 50 having the same diameter are disposed on one first sheet 20. However, the diameters of the plurality of wire-like transmission members 40 and 50 may be appropriately set, thus the wire-like transmission members 40 and 50 having different diameters may also be disposed on the same first sheet 20.

Figure 4:
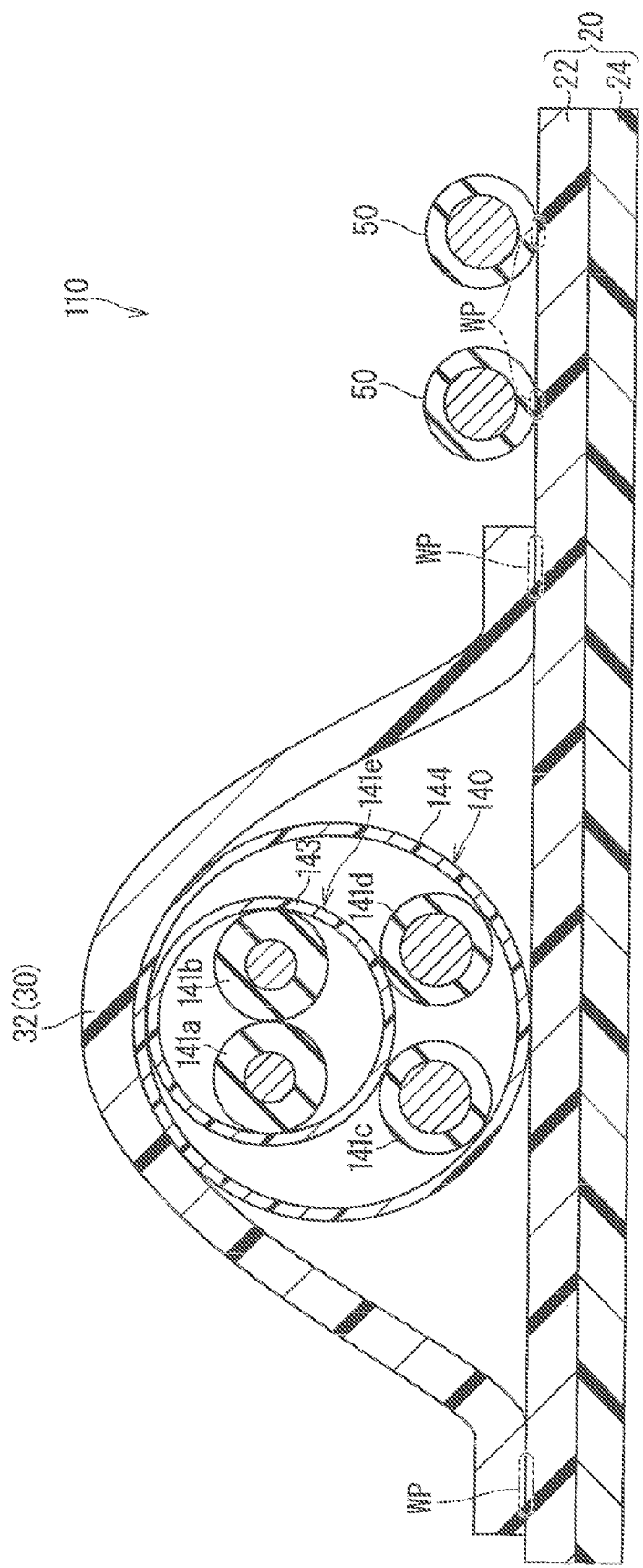
FIG. 4 is a cross-sectional view illustrating a modification example of the wiring member according to the embodiment 1.

As with a wiring member 110 illustrated in FIG. 4, for example, a diameter of a first wire-like transmission member 140 may be larger than a diameter of at least some second wire-like transmission member 50. In the example illustrated in FIG. 4, the first wire-like transmission member 140 is a cable such as an USB cable (also referred to as a multicore wire), and the second wire-like transmission member 50 is a single core wire, thus the diameter of the first wire-like transmission member 140 is larger than that of some second wire-like transmission member 50.

A cable 140 illustrated in FIG. 4 includes four covering electrical wires 141a, 141b, 141c, and 141d. Two covering electrical wires 141a and 141b in four covering electrical wires 141a, 141b, 141c, and 141d are collected by a sheath 143 to be a cable 141e. The two covering electrical wires 141c and 141d and one cable 141e are collected by a sheath 144 to be a cable 140. The sheath 144 is the first covering layer 144 in the cable 140. The first transmission wire body is a core wire of each of the covering electrical wires 141a, 141b, 141c, and 141d in the cable 140.

The first wire-like transmission member 40 includes a shield layer, thus the diameter of the first wire-like transmission member 40 may be larger than that of some second wire-like transmission member 50. A wire-like transmission member including a shield layer is also referred to as a shield wire or a coaxial wire. The shield layer is provided between the first transmission wire body 42 and the first covering layer 44 in the first wire-like transmission member 40. An insulating layer is normally provided between the shield layer and the first transmission wire body 42. The shield layer may be provided on the cable 140.

Effect Etc. of Embodiment 1

According to the wiring members 10 and 110 having the configurations described above, the first sheet 20 and the second sheet 30 are fixed via the fusion layer 22 in the direction intersecting with the longitudinal direction of the first wire-like transmission members 40 and 140, thus the first wire-like transmission members 40 and 140 are kept in a state provided between the first sheet 20 and the second sheet 30. Accordingly, the wire-like transmission member can be fixed to the first sheet 20 via the fusion layer 22 regardless of a type of the wire-like transmission member. The second sheet 30 includes the second sheet side fusion layer 32 fused to the first sheet side fusion layer 22 of the first sheet 20. Accordingly, the fusion layers 22 and 32 of the first sheet 20 and the second sheet 30 can be fused to each other, thus the first sheet 20 and the second sheet 30 are rigidly fixed to each other.

The second sheet 30 is provided in the positions on both sides of the bending parts 46 and 47 along the extension direction of the first wire-like transmission members 40 and 140, thus even when the first wire-like transmission members 40 and 140 are pulled along the extension direction, the first wire-like transmission members 40 and 140 and the first sheet 20 hardly deviate from each other.

The second sheet 30 is provided in the positions on both sides of each of the plurality of bending parts 46 and 47, thus even when the first wire-like transmission members 40 and 140 are pulled along the extension direction, the first wire-like transmission members 40 and 140 and the first sheet 20 hardly deviate from each other.

The first sheet side fusion layer 22 is made of polyvinyl chloride, and a material constituting the first covering layers 44 and 144 is different from polyvinyl chloride. Accordingly, the first wire-like transmission members 40 and 140 including the first covering layers 44 and 144 formed of a material different from polyvinyl chloride are easily fused and fixed to the first sheet 20 made of polyvinyl chloride via the second sheet 30.

The second covering layer 54 is fused to the first sheet side fusion layer 22, and the second wire-like transmission member 50 is fixed to the first sheet 20, thus the first wire-like transmission members 40 and 140 and the second wire-like transmission member 50 are fixed to the same first sheet 20. The second covering layer 54 is made up of a material different from the first covering layer 44, thus the first wire-like transmission member 40 and the second wire-like transmission member 50 each having the covering layer made up of a different material are fixed to the first sheet 20 via the fusion layer 22.

The second wire-like transmission member 50 is disposed on the first sheet 20 away from the second sheet 30, thus an overlap between the second sheet 30 and the second wire-like transmission member 50 is suppressed.

Embodiment 2

Figure 5:
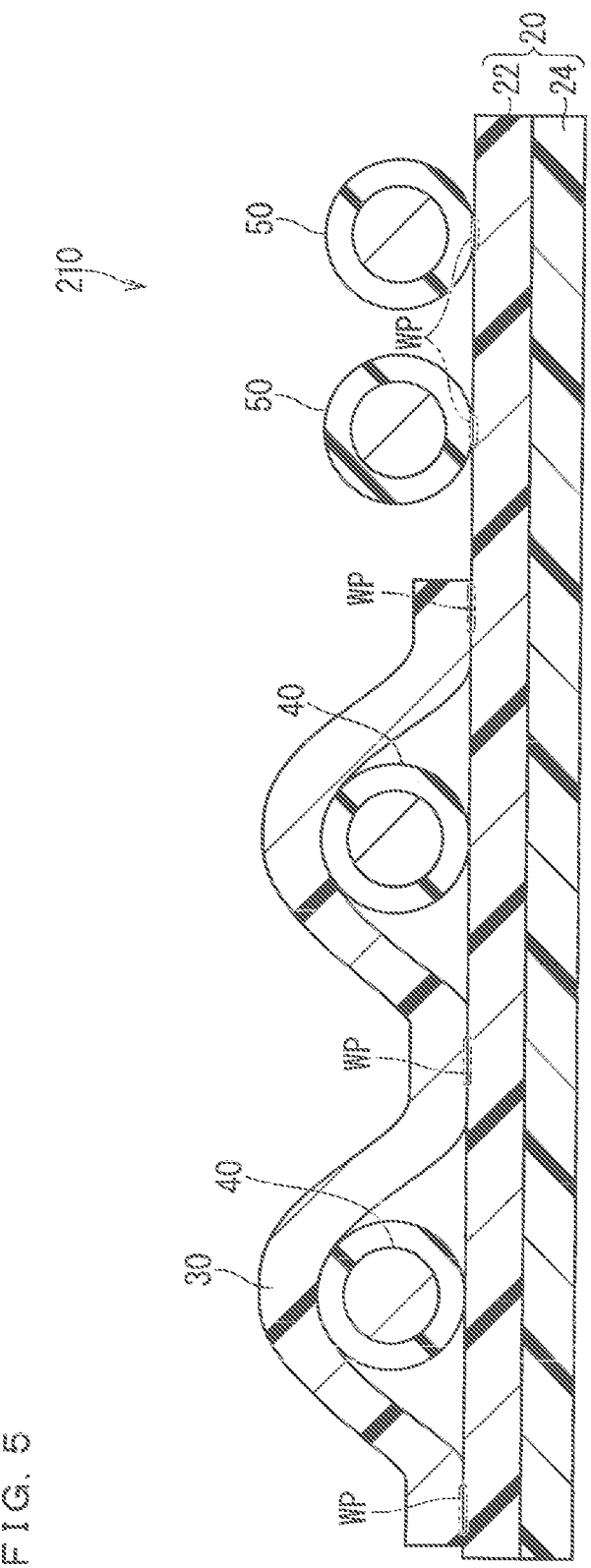
FIG. 5 is a cross-sectional view illustrating a wiring member according to an embodiment 2.

A wiring member according to an embodiment 2 is described. FIG. 5 is a cross-sectional plan view illustrating the wiring member according to the embodiment 2. In the following description of the present embodiment, the same reference numerals are assigned to the similar constituent elements described above, and the description thereof will be omitted.

A wiring member 210 is different from the wiring members 10 and 110 in that the plurality of first wire-like transmission members 40 are provided. The number of the first wire-like transmission members 40 is not particularly limited, but can be appropriately set. In the example illustrated in FIG. 5, two first wire-like transmission members 40 are provided, however, three or more first wire-like transmission members 40 may also be provided.

Provided in the description of present example is a section in which the plurality of first wire-like transmission members 40 are parallelly arranged. In the description of the present example, the plurality of first wire-like transmission members 40 are branched, that is to say, the plurality of first wire-like transmission members 40 are parallelly arranged in a part of a section, and are not parallelly arranged in the other part of the section. However, the section in which the plurality of first wire-like transmission members 40 are parallelly arranged needs not be provided. The plurality of first wire-like transmission members 40 may be parallelly arranged over a whole area.

The first sheet side fusion layer 22 and the second sheet side fusion layer 32 are fused between the plurality of first wire-like transmission members 40 in a parallel section. Suppressed accordingly is a configuration that the plurality of first transmission members 40 are disposed in one annular part formed of the first sheet 20 and the second sheet 30. That is to say, the plurality of annular parts formed of the first sheet 20 and the second sheet 30 are provided. One first wire-like transmission member 40 is passed through each of the plurality of annular parts. At this time, in the example illustrated in FIG. 5, the plurality of first wire-like transmission members 40 are held by one second sheet 30.

More specifically, one second sheet 30 is provided to pass across the plurality of first wire-like transmission members 40. The second sheet side fusion layer 32 is fused to the first sheet side fusion layer 22 in three or more positions including a position between the plurality of first wire-like transmission members 40 and both sides thereof in one second sheet 30. It is sufficient that the number of the fusion parts WP of the first sheet 20 and the second sheet 30 provided along the width direction of the first sheet is than the number of the first wire-like transmission members 40 by one, and it is obvious that the number of the fusion parts WP may be larger than that number.

Figure 6:
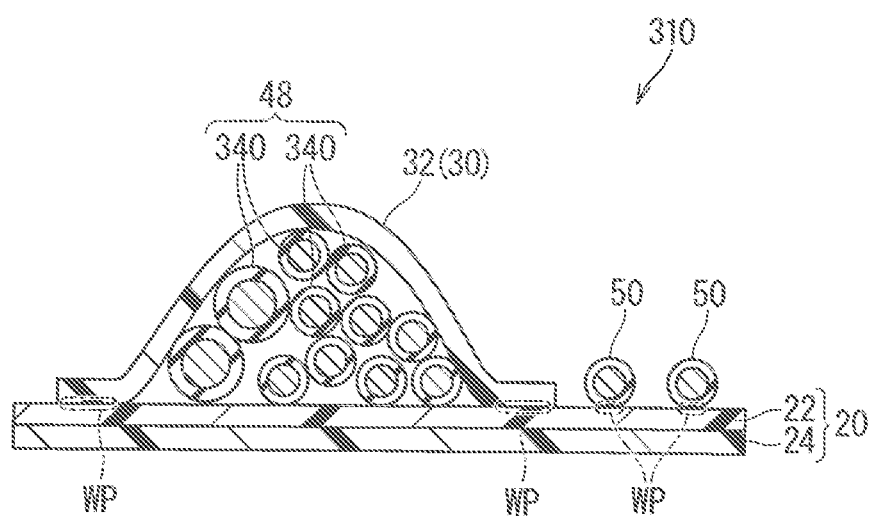
FIG. 6 is a cross-sectional view illustrating a wiring member according to an embodiment 3.

The plurality of first wire-like transmission members 40 may be held by different second sheets 30. In this case, the number of the fusion parts WP of the first sheet 20 and the second sheet 30 along the width direction of the first sheet 20 needs to be twice the number of the first wire-like transmission members 40. The first sheet side fusion layer 22 and the second sheet side fusion layer 32 may not be fused between the plurality of first wire-like transmission members 40 in the parallel section. In this case, the plurality of first wire-like transmission members are disposed in one annular part. Described in detail using FIG. 6 is a case where the plurality of first wire-like transmission members are disposed in one annular part. FIG. 6 is a cross-sectional plan view illustrating a modification example of the wiring member 210 according to the embodiment 2.

A wiring member 310 illustrated in FIG. 6 is different from the wiring member 210 described above in that a plurality of first wire-like transmission members 340 are disposed in an inner space of one annular part. A collected part 48 of the plurality of first wire-like transmission members 340 is provided in the wiring member 310. The collected part 48 is disposed in an inner space of one annular part. Accordingly, the collected part 48 can be simply fixed to the first sheet 20.

The plurality of first wire-like transmission members 340 may include a wire-like transmission member hardly fused to the first sheet 70 such as the first wire-like transmission members 40 and 140 described above. The plurality of first wire-like transmission members 340 may include a wire-like transmission member easily fused to the first sheet 20 such as the second wire-like transmission member 50 described above. The collected part 48 is a part where the plurality of first wire-like transmission members 340 are collected, thus is a part. fused to the first sheet 20 more hardly than the single second wire-like transmission member 50 described above in the manner similar to the first wire-like transmission members 40 and 140 described above.

The collected part 48 is preferably provided in a part of a route of the plurality of first wire-like transmission members 340 on the first sheet 20. One of or both end portions of the collected part 48 may be located on an outer side of the first sheet 20. That is to say, the plurality of first wire-like transmission members 340 constituting the collected part 48 may extend to an outer side from an outer edge portion of the first sheet 20 while being kept in a form of the collected part 48. One of or both end portions of the collected part 48 may be located on the first sheet.

A configuration of the plurality of first wire-like transmission members 340 constituting the collected part 48 may not be changed from one end portion to the other end portion of the collected part 48. A configuration of the plurality of first wire-like transmission members 340 constituting the collected part 48 may be changed in a midway portion between one end portion and the other end portion of the collected part 48. Some of the plurality of first wire-like transmission members 340 constituting the collected part 48 may deviate from the collected part 48 in a midway portion between one end portion and the other end portion of the collected part 48. The other first wire-like transmission member 340 may be newly joined to the collected part 48 in a midway portion between one end portion and the other end portion of the collected part 48. One of or both the deviation of the first wire-like transmission member 340 and joining of the first wire-like transmission member 340 to the collected part 48 may be performed on the first sheet 20.

The plurality of first wire-like transmission members 340 are not collected by a collecting member other than the second sheet 30 in the collected part 48. The plurality of first wire-like transmission members 340 may be collected by a collecting member other than the second sheet 30 in the collected part 48. Any member may be applicable as such a collecting member. For example, the collecting member may be a banding member such as an adhesive tape or a tube member such as a corrugate tube. The collecting member is not preferably a member sequentially extrusion-molded around the plurality of first wire-like transmission members 340 such as the sheath 143, for example. The collecting member may be sequentially provided along tin extension direction of the collected part 48, or may also be provided in a plurality of positions at intervals. When the collected part 48 is collected by the collecting member, the second sheet 30 may cover a part of the collected part 48 collected by the collecting member or a part thereof which is not collected by the collecting member.

The first covering layers 44 of all of the first wire-like transmission members 40 may be made up of the same type of resin material. For example, a resin material constituting the first covering layers 44 of all of the first wire-like transmission members 40 may be PE. A resin material constituting the first covering layer 44 of some first wire-like transmission member 40 and a resin material constituting the first covering layer 44 of the other some first wire-like transmission member 40 may be different from each other. For example, the first wire-like transmission member 40 with the first covering layer 44 made of PE and the first wire-like transmission member 40 with the first covering layer 44 made of fluorine resin may be provided.

In the example illustrated in FIG. 5, the plurality of first wire-like transmission members 40 are parallelly arranged in positions adjacent to each other without sandwiching the second wire-like transmission member 50 therebetween in a parallel section. In this case, the plurality of first wire-like transmission members 40 are preferably held by one second sheet 30 as with the example illustrated in FIG. 5.

The plurality of first wire-like transmission members 40 may be parallelly arranged while sandwiching the second wire-like transmission member 50 therebetween in the parallel section. In this case, the plurality of first wire-like transmission members 40 are preferably held by the different second sheets 30. Two first wire-like transmission members 40 may be located on an outermost side in both sides of the plurality of wire-like transmission members 40 and 50 along the parallel direction.

Effect Etc. of Embodiment 2

An effect similar to that of the wiring members 10 and 110 according to the embodiment 1 can be obtained also by the wiring member 210 having the above configuration.

According to the wiring member 210, the first sheet side fusion layer 22 and the second sheet side fusion layer 32 are fused to each other between the plurality of first wire-like transmission members 40, thus the plurality of first wire-like transmission members 40 are partitioned by the second sheet 30, and contact of the plurality of first wire-like transmission members 40 is suppressed.

The second sheet side fusion layer 32 is fused to the first sheet side fusion layer 22 in tree or more positions including a position between the plurality of first wire-like transmission members 40 and both sides thereof in one second sheet 30. Accordingly, the plurality of first wire-like transmission members 40 are fixed to the first sheet 20 by one second sheet 30.

Modification Example

Moreover, in the above description, the bending parts 46 and 47 are provided in the first wire-like transmission member 40, and the first sheet 20 and the second sheet 30 are fused to each other in the positions on both sides of the bending parts 46 and 47, however, this configuration is not necessary. The bending parts 46 and 47 need not be provided in the first wire-like transmission member 40. Even in the case where the bending parts 45 and 47 are provided in the first wire-like transmission member 40, the number thereof is not particularly limited, however, one or three or more bending parts may be provided. Even in the case where the bending parts 46 and 47 are provided in the first wire-like transmission member 40, the first sheet 20 and the second sheet 30 need not be fused to each other in the positions on both sides of the bending parts 46 and 47.

In the above description, the second sheet 30 is provided to cover a part of the first sheet 20 along the width direction of the first sheet 20, however, this configuration is not necessary. The second sheet 30 may be provided to cover the whole first sheet 20 along the width direction of the first sheet 20. In this case, the second wire-like transmission member 50 is disposed on a part of the first sheet 20 covered by the second sheet 30.

Even in the case where the second sheet 30 is provided to cover a part of the first sheet along the width direction of the first sheet 20, the second wire-like transmission member 50 may be disposed on a part of the first sheet 20 covered by the second sheet 30.

When the second wire-like transmission member 50 is disposed on a part of the first sheet 20 covered by the second sheet 30, the second wire-like transmission member 50 may be sandwiched between the first sheet 20 and the second sheet 30 in the manner similar to the first wire-like transmission member 40. In this case, it is sufficient that the second sheet 30 and the first sheet 20 are fused between the first wire-like transmission member 40 and the second wire-like transmission member 50 to partition the first wire-like transmission member 40 and the second wire-like transmission member 50. When the second wire-like transmission member 50 is disposed on a part of the first sheet 20 covered by the second sheet 30, the second sheet 30 may be sandwiched between the first sheet 20 and the second wire-like transmission member 50. In this case, the fusion part WP of the second wire-like transmission member 50 and the first sheet 20 is preferably provided in a position which is not overlapped with the second sheet 30 along the extension direction of the second wire-like transmission member 50.

In the above description, a part of the second sheet side fusion layer 32 along the extension direction of the first wire-like transmission members 40 and 140 is fused to the first sheet side fusion layer 22, however, this configuration is not necessary. The whole second sheet side fusion layer 32 along the extension direction of the first wire-like transmission members 40 and 140 may be fused to the first sheet side fusion layer 22.

In the above description, the second sheet 30 includes the second sheet side fusion layer 32, however, this configuration is not necessary. The second sheet 30 needs not include the second sheet side fusion layer 32. The second sheet 30 preferably includes, in a surface thereof, a layer which can be fused to the first sheet side fusion layer 22.

A color of the second sheet 30 (color of the second sheet side fusion layer 32) and a color of the first covering layers 44 and 144 may be the same as or different from each other. When the color of the second sheet (color of the second sheet side fusion layer 32) and the color of the first covering layers 44 and 144 are different from each other, a position of the second sheet 30 is easily recognized in a case where the second sheet 30 is partially provided in the first wire-like transmission members 40 and 140. Accordingly, suppressed is that a fusion machine is applied to a portion of the first wire-like transmission members 40 and 140 where second sheet 30 is not provided.

The configurations described in the embodiments and modification examples thereof can be appropriately combined as long as they are not contradictory.

EXPLANATION OF REFERENCE SIGNS 10, 110, 210, 310 wiring member
20 first sheet
22 first layer (first sheet side fusion layer)
24 second layer 30, 30a, 30b second sheet
32 second sheet side fusion layer
40, 340 first wire-like transmission member
42 first transmission wire body
44 first covering layer
46, 47 bending part
48 collected part
140 first wire-like transmission member (cable)
141a, 141b, 141c, 141d covering electrical wire
141e cable
143 sheath
144 first covering layer (sheath)
50 second wire-like transmission member
52 second transmission wire body
54 second covering layer
C connector
WP fusion part

The invention claimed is:

1. A wiring member comprising:
a first sheet including a fusion layer;
a second sheet;
at least one first wire-like transmission member provided between the first sheet and the second sheet, wherein a portion of the at least one first wire-like transmission member located within the second sheet extends from a first edge of the second sheet to a second edge of the second sheet, and wherein the at least one first wire-like transmission member has a first covering layer over an entire area from the first edge of the second sheet to the second edge of the second sheet; and
a second wire-like transmission member including a second transmission wire body and a second covering layer, wherein
the first sheet and the second sheet are fixed to each other via the fusion layer in a direction intersecting with a longitudinal direction of the at least one first wire-like transmission member,
the second covering layer is fused to the fusion layer, and the second wire-like transmission member is fixed to the first sheet,
the second sheet is provided in a plurality of positions at intervals along an extension direction of the at least one first wire-like transmission member,
the second wire-like transmission member is fused to the first sheet at a plurality of positions at intervals along an extension direction,
a fusion part of the second wire-like transmission member and the first sheet is provided in a position adjacent to the second sheet,
at least one bending part of the at least one first wire-like transmission member bended and disposed on the first sheet is provided,
the second sheet is provided in positions on both sides of the bending part in the extension direction of the at least one first wire-like transmission member,
the at least one first wire-like transmission member is not directly bonded to any of the first sheet and the second sheet, and
wherein the at least one first wire-like transmission member and the second wire-like transmission member are provided on a same side of the first sheet.

2. The wiring member according to claim 1, wherein the plurality of bending parts are provided, and the second sheet is provided in positions on both sides of each of the plurality of bending parts.

3. The wiring member according to claim 1, wherein the at least one first wire-like transmission member includes a first transmission wire body and the first covering layer covers the first transmission wire, the fusion layer is made of polyvinyl chloride, and a material constituting the first covering layer is different from polyvinyl chloride.

4. The wiring member according to claim 1, wherein the second wire-like transmission member is disposed on the first sheet away from the second sheet.

5. The wiring member according to claim 1, wherein the second covering layer is made up of a material different from a material of a first covering layer of the at least one first wire-like transmission member.

6. The wiring member according to claim 1, wherein the least one first wire-like transmission member is a plurality of first wire-like transmission members, a section where the plurality of first wire-like transmission members are parallelly arranged is provided, and the fusion layer and the second sheet are fused to each other between the plurality of first wire-like transmission members.

7. The wiring member according to claim 6, wherein one piece of the second sheet is provided across the plurality of first wire-like transmission members, and the second sheet is fused to the first sheet in three or more positions including a position between the plurality of first wire-like transmission members and positions on both sides of the position in the one piece of the second sheet.

8. The wiring member according to claim 1, wherein the second sheet includes a second sheet side fusion layer fused to the fusion layer of the first sheet.

9. A wiring member comprising:
a first sheet including a fusion layer;
a second sheet;
at least one first wire-like transmission member provided between the first sheet and the second sheet, wherein a portion of the at least one first wire-like transmission member located within the second sheet extends from a first edge of the second sheet to a second edge of the second sheet, and wherein the at least one first wire-like transmission member has a first covering layer over an entire area from the first edge of the second sheet to the second edge of the second sheet; and
a second wire-like transmission member including a second transmission wire body and a second covering layer, wherein
the first sheet and the second sheet are fixed to each other via the fusion layer in a direction intersecting with a longitudinal direction of the at least one first wire-like transmission member,
the second covering layer is fused to the fusion layer, and the second wire-like transmission member is fixed to the first sheet,
the second sheet is provided in a plurality of positions at intervals along an extension direction of the at least one first wire-like transmission member,
the second wire-like transmission member is fused to the first sheet at a plurality of positions at intervals along an extension direction,
a fusion part of the second wire-like transmission member and the first sheet is provided in a position adjacent to the second sheet,
wherein the at least one first wire-like transmission member is a plurality of first wire-like transmission members, a collected part where the plurality of first wire-like transmission members are collected is provided, the collected part is disposed inside one annular part formed by the first sheet and the second sheet so that the plurality of first wire-like transmission members constituting the collected part are overlapped in a stacked direction of the first sheet and the second sheet, and wherein the plurality of first wire-like transmission members and the second wire-like transmission member are provided on a same side of the first sheet.

10. The wiring member according to claim 9, wherein a bending part of the plurality of first wire-like transmission members bended and disposed on the first sheet is provided, and the second sheet is provided in positions on both sides of the bending part in an extension direction of the plurality of first wire-like transmission members.

11. A wiring member comprising:

a first sheet including a fusion layer;

a plurality of second sheets, wherein the first sheet includes a plurality of corresponding parts that correspond to the plurality of second sheets, respectively, and a connection part connecting the plurality of corresponding parts;

at least one first wire-like transmission member provided between the first sheet and the plurality of second sheets, wherein a portion of the at least one first wire-like transmission member located within the second sheet extends from a first edge of the second sheet to a second edge of the second sheet, and wherein the at least one first wire-like transmission member has a first covering layer over an entire area from the first edge of the second sheet to the second edge of the second sheet; and a second wire-like transmission member including a second transmission wire body and a second covering layer, wherein the first sheet and the plurality of second sheets are fixed to each other via the fusion layer in a direction intersecting with a longitudinal direction of the at least one first wire-like transmission member, the second covering layer is fused to the fusion layer, and the second wire-like transmission member is fixed to the first sheet, the plurality of second sheets is provided in a plurality of positions at intervals along an extension direction of the at least one first wire-like transmission member, the second wire-like transmission member is fused to the first sheet at a plurality of positions at intervals along an extension direction, a fusion part of the second wire-like transmission member and the first sheet is provided in positions adjacent to the plurality of second sheets, at least one bending part of the at least one first wire-like transmission member bended and disposed on the first sheet is provided, the plurality of second sheets is provided in positions on both sides of the bending part in the extension direction of the at least one first wire-like transmission member, and the at least one first wire-like transmission member is not directly bonded to any of the first sheet and the plurality of second sheets.

12. The wiring member according to claim 11, wherein a bending connection part in the connection part of the first sheet corresponding to a bending part of the at least one first wire-like transmission member has a bending shape corresponding to the bending part.

13. The wiring member according to claim 11, wherein the first sheet is formed into a shape having a branch part, and the bending connection part of the first sheet constitutes a part of the branch part.

14. A wiring member comprising:

a first sheet including a fusion layer;

a plurality of second sheets, wherein the first sheet includes a plurality of corresponding parts that correspond to the plurality of second sheets, respectively, and a connection part connecting the plurality of corresponding parts;

at least one first wire-like transmission member provided between the first sheet and the plurality of second sheets, wherein a portion of the at least one first wire-like transmission member located within the second sheet extends from a first edge of the second sheet to a second edge of the second sheet, and wherein the at least one first wire-like transmission member has a first covering layer over an entire area from the first edge of the second sheet to the second edge of the second sheet; and a second wire-like transmission member including a second transmission wire body and a second covering layer, wherein the first sheet and the plurality of second sheets are fixed to each other via the fusion layer in a direction intersecting with a longitudinal direction of the at least one first wire-like transmission member, the second covering layer is fused to the fusion layer, and the second wire-like transmission member is fixed to the first sheet, the plurality of second sheets is provided in a plurality of positions at intervals along an extension direction of the at least one first wire-like transmission member, the second wire-like transmission member is fused to the first sheet at a plurality of positions at intervals along an extension direction, a fusion part of the second wire-like transmission member and the first sheet is provided in positions adjacent to the plurality of second sheets, wherein the at least one first wire-like transmission member is a plurality of first wire-like transmission members, a collected part where the plurality of first wire-like transmission members are collected is provided, and the collected part is disposed inside one annular part formed by the first sheet and the plurality of second sheets so that the plurality of first wire-like transmission members constituting the collected part are overlapped in a stacked direction of the first sheet and the plurality of second sheets.

15. The wiring member according to claim 14, wherein each of the plurality of second sheets includes a second sheet side fusion layer fused to the fusion layer of the first sheet, and wherein a bending connection part in the connection part of the first sheet corresponding to a bending part of the plurality of first wire-like transmission members has a bending shape corresponding to the bending part.

16. The wiring member according to claim 14, wherein each of the plurality of second sheets includes a second sheet side fusion layer fused to the fusion layer of the first sheet, and wherein the first sheet is formed into a shape having a branch part, and the bending connection part of the first sheet constitutes a part of the branch part.

\* \* \* \* \*